UNITED STATES PATENT OFFICE.

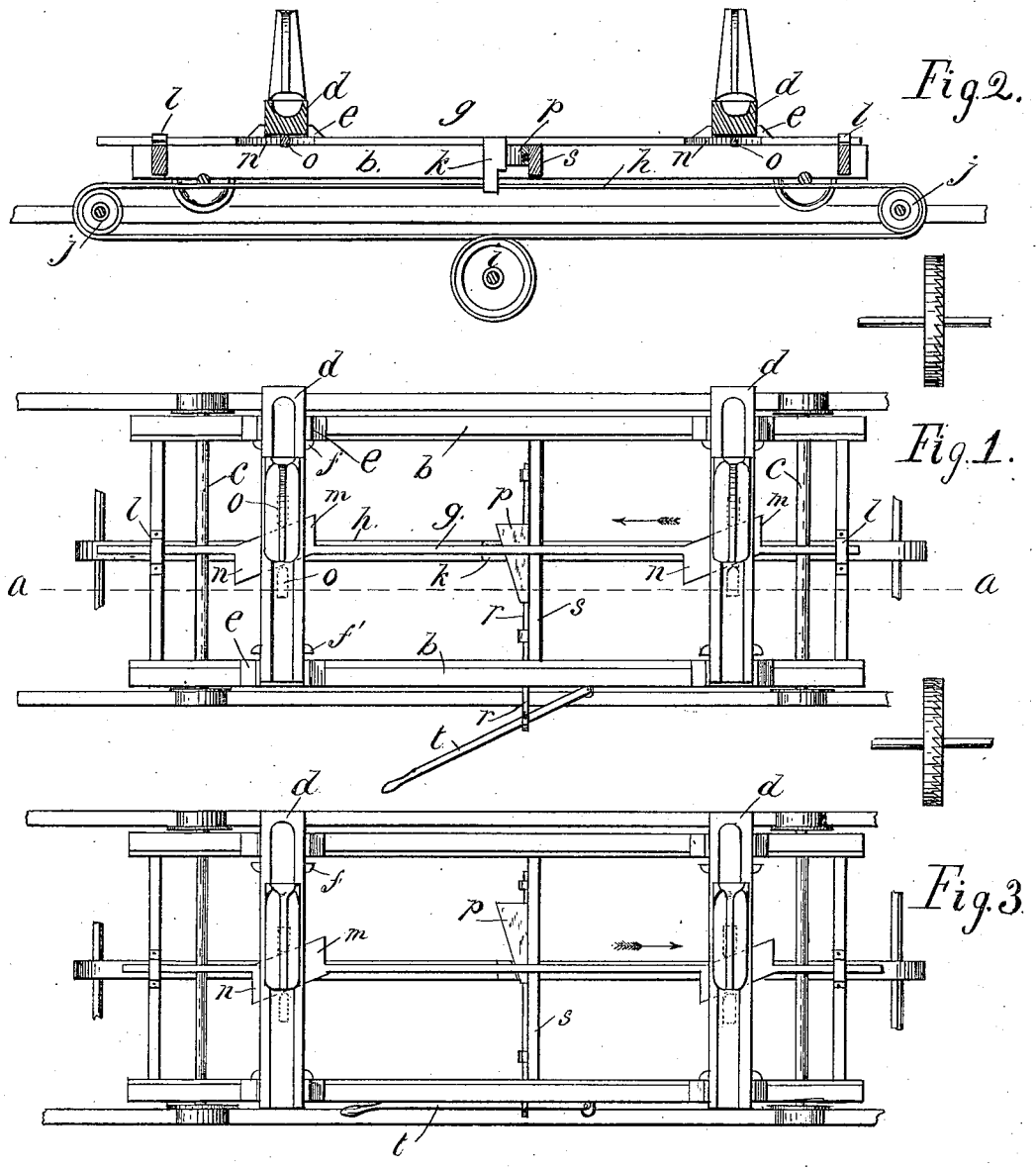

JOSEPH COOK, OF INDIANAPOLIS, INDIANA, ASSIGNOR TO SINKER, DAVIS & CO., OF SAME PLACE.

SAW-MILL SET-WORKS.

SPECIFICATION forming part of Letters Patent No. 306,811, dated October 21, 1884.

Application filed July 11, 1884. (No model.)

*To all whom it may concern:*

Be it known that I, JOSEPH COOK, a citizen of the United States, residing at Indianapolis, in the county of Marion and State of Indiana, have invented a new and useful Improvement in Log-Carriages for Saw-Mills, of which the following is a specification.

My invention relates to an improved means for automatically moving the log on the carriage.

The object of my improvement is to give the log a slight transverse movement away from the saw, so as to prevent the cut surface of the log from coming in contact with the side of the saw during the backward movement of the carriage. This object I attain by mounting the head-block on the carriage-frame, so as to have a slight endwise movement at a right angle to the line of movement of the carriage, as hereinafter fully explained.

The accompanying drawings illustrate my invention.

Figure 1 is a plan showing the position of the head-blocks and the mechanism for moving them during the forward movement of the carriage. Fig. 2 is a section on the line *a a*. Fig. 3 is a plan showing the position of the head-blocks and the mechanism for moving them during the backward movement of the carriage.

The carriage-frame *b* and trucks *c c* are of ordinary well-known construction, the flanges of the trucks fitting snugly between the rails of the carriage-way, and the frame so mounted on the trucks as to have no transverse movement. The head-blocks *d d*, instead of being bolted rigidly to the carriage-frame, as is usual, rest at each end in bearings E E. Said bearings are bolted to the side timbers of the carriage-frame, and the head-blocks are fitted to slide endwise in said bearings, their movement being limited by cleats or lugs *f* and *f'*, which come alternately in contact with the inside of the bearings.

*g* is the draft-beam, to which the feed mechanism is connected for moving the carriage. Said feed mechanism may consist of a belt, *h*, passing over the feed-wheel *i* and idler-pulleys *j j*, and attached to the draft-beam arm *k*. The draft-beam is not rigidly secured to the carriage frame, as is usual, but is mounted thereon in bearings *l l*, in which the draft-beam slides longitudinally parallel to the line of movement of the carriage. To opposite sides of the draft-beam, directly under each head-block, wedges *m* and *n* are secured, the wide end of the wedge on one side being opposite the narrow end of the wedge on the other side. The outer edges of said wedges engage lugs *o*, (shown in dotted lines in Figs. 1 and 3,) secured to the under side of the head-blocks in such a manner that as the draft beam is slid forward and backward in its bearings in a line parallel to the line of movement of the carriage the head-blocks will be forced to move endwise in a line at a right angle to the carriage line of movement.

The operation of my device is as follows: The log to be sawed having been secured on the head-blocks *d d* and adjusted in the usual manner, the feed mechanism is started in the direction indicated by the arrow, Fig. 1. The first result of the feed movement is to draw the draft-beam forward without moving the carriage, thus, by means of the wedges *m m*, sliding the head-blocks toward the saw until they are stopped by lugs *f* coming in contact with the inside of bearings *e*. The carriage then begins to move forward, and the cut is made. When the feed mechanism is reversed to move in the direction indicated in Fig. 3, the first effect is to start the draft-beam, as before, and the wedges *n n* operate to slide the head-blocks endwise away from the saw until stopped by the lugs *f'*. The carriage is then drawn back to its starting-point, the log moving entirely clear of the saw. It is sometimes desirable to feed the log-carriage backward before the cut through the log is completed, in which case the position of the head-blocks and log must not be changed.

For the purpose of locking the draft-beam and head-blocks in position at such times, I use a wedge, *p*, mounted on a rod, *r*, adapted to slide in bearings on a cross-timber, *s*, of the carriage-frame. Said wedge is drawn, by means of a lever, *t*, from its normal position, as shown in Fig. 3, to the position shown in Fig. 1, thereby filling the space between arm *k* and timber *s* and preventing the independent movement of the draft-beam.

I am aware of the state of the art as shown in the patent to C. R. Ely, No. 163,309, and I do not claim anything therein shown.

I claim as my invention—

1. A log-carriage for saw-mills, consisting of a series of trucks, a frame mounted thereon and having a fixed position in relation thereto, a draft-beam mounted on said frame and adapted to have a limited longitudinal movement in relation thereto, a pair of head-blocks adapted to support a log and to have a short limited movement transversely on said frame, and means for connecting said draft-beam with said frame and said head-blocks, whereby the head-blocks are moved transversely on the frame by the longitudinal movement of said draft-beam, all substantially as and for the purpose specified.

2. The combination of a saw, a frame mounted on a series of trucks and adapted to move along a fixed track beside said saw, a feed mechanism adapted to move said frame and trucks forward and backward along said track, a pair of head-blocks adapted to support a log and to have a short limited movement transversely on said frame, and means for connecting said feed mechanism with said head-blocks, whereby the head-blocks are moved transversely on said frame alternately toward and from the side of the saw at each forward and backward movement of the frame, substantially as and for the purpose specified.

3. In a log-carriage, the combination, with the carriage-frame and the sliding draft-beam, having arm *k*, of wedge *p*, adapted to engage said frame and said arm, rod *r*, and lever *t*, whereby said wedge is actuated and the draft-beam locked in position, as specified.

JOSEPH COOK.

Witnesses:
 H. P. Hood,
 O. P. Hood.